US007849188B2

(12) United States Patent
Yu

(10) Patent No.: US 7,849,188 B2
(45) Date of Patent: Dec. 7, 2010

(54) END-TO-END TRACKING OF ASYNCHRONOUS LONG-RUNNING BUSINESS PROCESS EXECUTION LANGUAGE PROCESSES

(75) Inventor: Jean Xu Yu, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 713 days.

(21) Appl. No.: 11/550,858

(22) Filed: Oct. 19, 2006

(65) Prior Publication Data

US 2008/0098108 A1 Apr. 24, 2008

(51) Int. Cl.
*G06F 15/173* (2006.01)
(52) U.S. Cl. ...................................................... 709/224
(58) Field of Classification Search .................. 709/224
See application file for complete search history.

(56) References Cited

U.S. PATENT DOCUMENTS

| 6,548,997 | B1 * | 4/2003 | Bronfer et al. ........... 324/76.48 |
| 7,568,023 | B2 * | 7/2009 | Green et al. ................. 709/224 |
| 2002/0082919 | A1 * | 6/2002 | Landau et al. ................ 705/14 |
| 2002/0173997 | A1 * | 11/2002 | Menard et al. ................. 705/7 |
| 2004/0225546 | A1 * | 11/2004 | Oberdorfer et al. ............ 705/8 |
| 2005/0222931 | A1 | 10/2005 | Mamou et al. |
| 2006/0168594 | A1 * | 7/2006 | Deverill et al. .............. 719/318 |
| 2006/0206882 | A1 * | 9/2006 | Illowsky et al. ............. 717/144 |
| 2006/0233105 | A1 * | 10/2006 | Rapp .......................... 370/230 |
| 2006/0241954 | A1 * | 10/2006 | Jeng et al. ....................... 705/1 |
| 2006/0248016 | A1 * | 11/2006 | Ginter et al. .................. 705/54 |
| 2007/0027742 | A1 * | 2/2007 | Emuchay et al. ............. 705/10 |

OTHER PUBLICATIONS

U.S. Appl. No. 11/193,840, filed Jul. 29, 2009, Emuchay et al.
USPTO office action for U.S. Appl. No. 11/193,840 dated Sep. 16, 2009.

* cited by examiner

*Primary Examiner*—Wing F Chan
*Assistant Examiner*—Tesfay Yohannes
(74) *Attorney, Agent, or Firm*—Yee & Associates, P.C.; Jeffrey S. LaBaw

(57) ABSTRACT

Computer implemented method, system and computer usable program code for end-to-end transaction tracking of long-running processes such as a Business Process Execution Language (BPEL) process in a data processing system, such as a data processing system implemented in a Service-Oriented Architecture (SOA). A computer implemented method for tracking and correlating transactions in a process in a data processing system includes gathering instance identification data and instance state data regarding a transaction and storing the instance identification data and instance state data in association with transaction data regarding the transaction. Asynchronous event data is collected, and transaction performance information for an asynchronous event within the transaction is calculated using the transaction data. A tracking report of the transaction is then generated using the calculated transaction performance information.

16 Claims, 7 Drawing Sheets

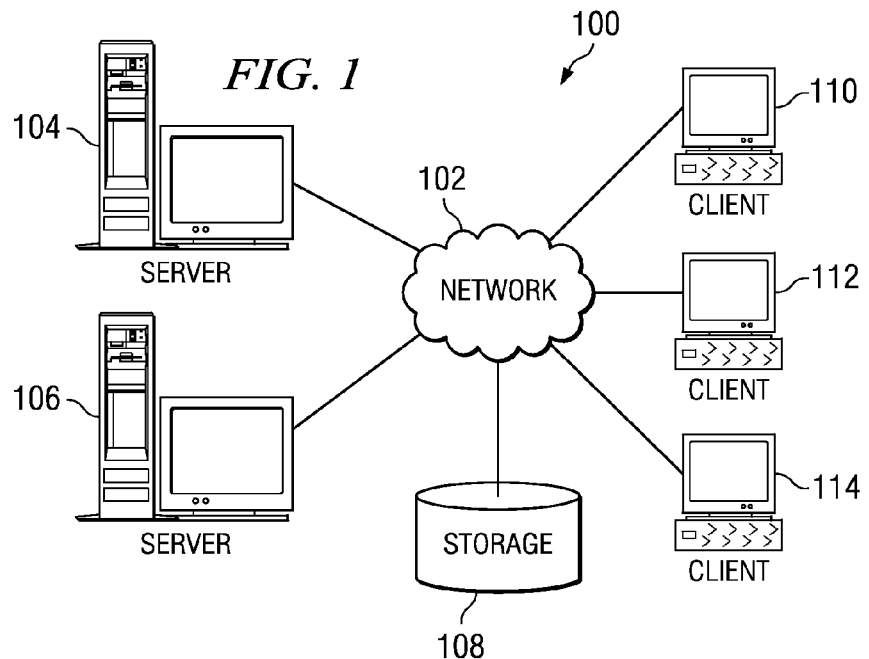
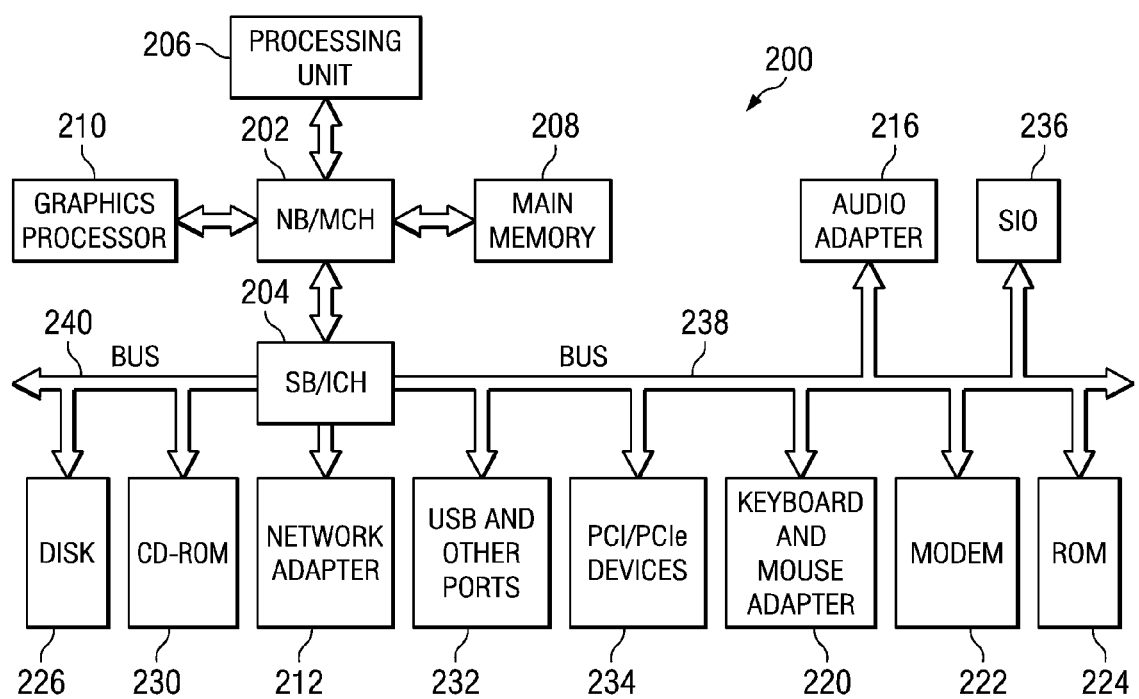

FIG. 6

START EVENT DETAILS 600

| NAME | VALUE |
|---|---|
| globalInstanceId | CEC05DB5C52F6E90339824ECD0334F11D9 |
| extensionName | WPC:ProcessInstanceEvent |
| creationTime | 2005-11-10T19:34:53:213Z |
| ContextDataElement: ECSCurrentID/contextValue | _PI:10030100.23fb340d.ac3cd9f6.136200b8 |
| ContextDataElement: ECSParentID/contextValue | _PI:10030100.23fb33fe.ac3cd9f6.136200a6 |
| ExtendedDataElement: Username | UNAUTHENTICATED |
| ExtendedDataElement: processTemplateName | MileStoneManager |
| ExtendedDataElement: processTemplateID | _PT:90010100.22fcafbd.ac3cd9f6.cfc80161 |
| ExtendedDataElement: processInstanceID | _PT:10030100.23fb340d.ac3cd9f6.136200b8 |
| ExtendedDataElement: processInstanceExecutionState | 2-STATE_RUNNUNG |
| ExtendedDataElement: processTemplateValidFrom | Wed 2005-01-01 00:00:00.000 |
| sourceComponentID/component | WBI-SF#Platform 5.1 [BASE 5.1.1 a0426.01] [JDK 1.4.1${build.level}] [PME 5.1.1 o0429.02] |
| sourceComponentID/subcomponent | WPC |
| sourceComponentID/componentIdType | ProductName |
| sourceComponentID/instanceId | localhost\localhost\server1 |
| sourceComponentID/application | |
| sourceComponentID/executionEnvironment | Windows 2000[x86]#5.0 |
| sourceComponentID/location | remote.austin.ibm.com |
| sourceComponentID/locationType | Hostname |
| sourceComponentID/processId | 1520 |
| sourceComponentID/threadId | Servlet.Engine.Transports: 0 |
| sourceComponentID/componentType | http://www.ibm.com/namespaces/autonomic/ Workflow_engine |
| situation/categoryName | StartSituation |
| situation/situationType/reasoningScope | EXTERNAL |
| situation/StartSituation/successDisposition | SUCCESSFUL |
| situation/StartSituation/situationQualifier | START_COMPLETED |

FIG. 7

STOP EVENT DETAILS 700

| NAME | VALUE |
|---|---|
| globalInstanceId | CEC05DB5C52F6E9033D38E4690334F11D9 |
| extensionName | WPC:ProcessInstanceEvent |
| creationTime | 2005-11-10T19:36:32:889Z |
| ContextDataElement: ECSCurrentID/contextValue | _PI:10030100.23fb340d.ac3cd9f6.136200b8 |
| ContextDataElement: ECSParentID/contextValue | _PI:10030100.23fb33fe.ac3cd9f6.136200a6 |
| ExtendedDataElement: WPCEventCode | 21004 |
| ExtendedDataElement: processInstanceExecutionState | 3-STATE_FINISHED |
| sourceComponentID/component | WBI-SF#Platform 5.1 [BASE 5.1.1 a0426.01] [JDK 1.4.1$[build.level}] [PME 5.1.1 o0429.02] |
| sourceComponentID/subcomponent | WPC |
| sourceComponentID/componentIdType | ProductName |
| sourceComponentID/componentType | localhost\localhost\server1 |
| sourceComponentID/executionEnvironment | Windows 2000[x86]#5.0 |
| sourceComponentID/location | remote.austin.ibm.com |
| sourceComponentID/locationType | Hostname |
| sourceComponentID/processId | 1520 |
| sourceComponentID/threadId | Servlet.Engine.Transports: 0 |
| sourceComponentID/componentType | http://www.ibm.com/namespaces/autonomic/Workflow_engine |
| situation/categoryName | StopSituation |
| situation/situationType/reasoningScope | EXTERNAL |
| situation/StopSituation/successDisposition | SUCCESSFUL |
| situation/StopSituation/situationQualifier | STOP_COMPLETED |

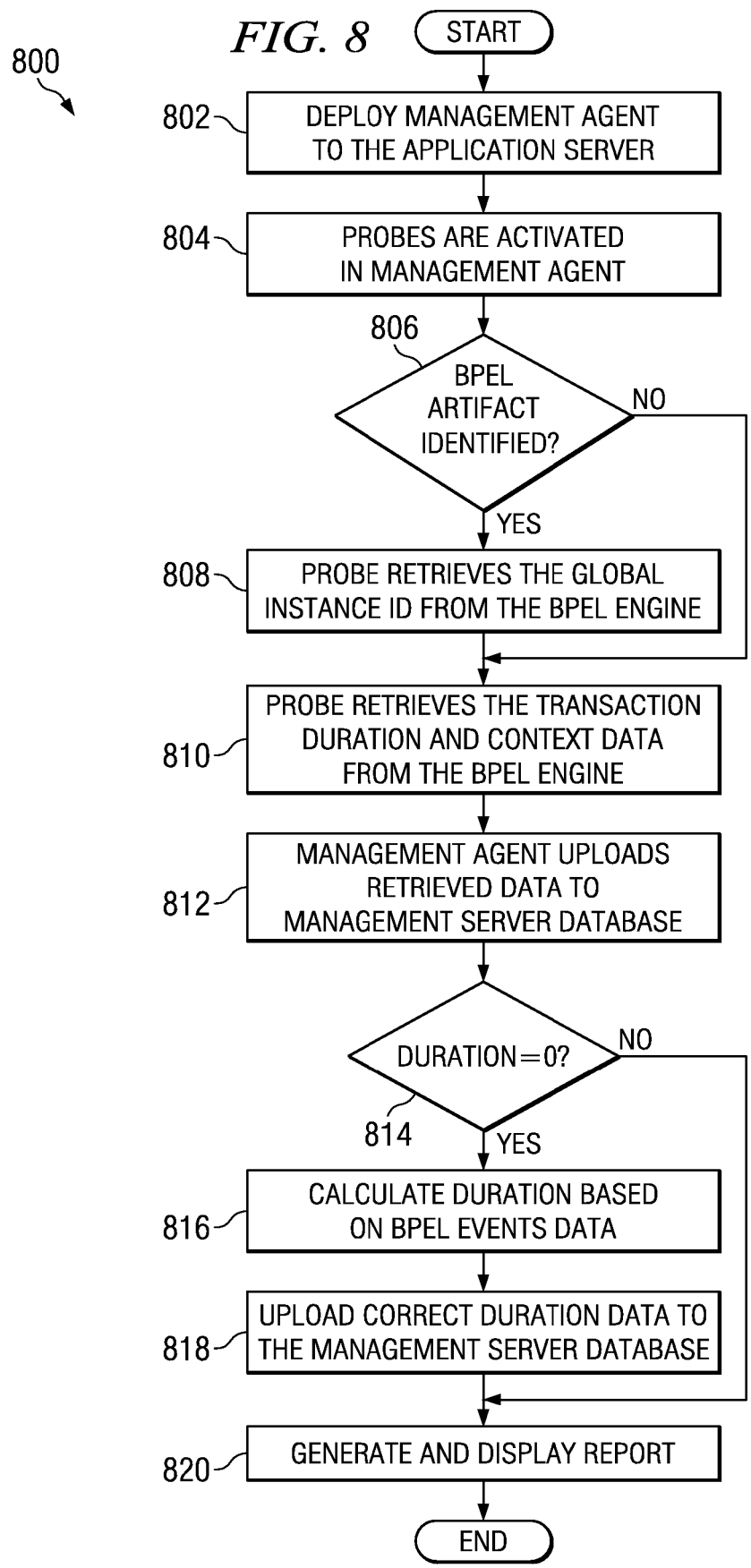

END-TO-END TRACKING OF ASYNCHRONOUS LONG-RUNNING BUSINESS PROCESS EXECUTION LANGUAGE PROCESSES

BACKGROUND OF THE INVENTION

1. Field of the Invention

The present invention relates generally to the data processing field and, more particularly, to a computer implemented method, system and computer usable program code for end-to-end transaction tracking of long-running processes such as a Business Process Execution Language process using a combined flow-based/event-based approach.

2. Description of the Related Art

A Service-Oriented Architecture (SOA) is a collection of services that communicate with one another over a network in order to carry out business processes. Communication in an SOA can involve the simple passing of data or it can involve two or more services that coordinate some activity. Such services are loosely coupled (meaning that one application does not need to know the technical details of another application in order to communicate with the other application), have well-defined platform independent interfaces, and are reusable. In general, a service-oriented approach enables one or more businesses to link together fragmented data and business processes in order to create a more complete view of operations.

As the basis of an SOA, Business Process Execution Language (BPEL) provides a standard, portable language for orchestrating services into end-to-end business processes. Real world business processes involving multiple partners are generally long in duration considering the following factors:

1. Message exchange between business partners across corporate boundaries is often slow and unreliable;
2. Batch processing in legacy back-end systems may take a long time;
3. Data and/or transport conversions are often required and may take a long time; and
4. Long-running processes support human interactions in which case applications must often wait for the human interactions in order to proceed.

In order to support long-running processes, individual invocations from each process are decoupled from an initial request in order to improve efficiency and to break up the processing into a recoverable set of transactions. Invocations are run in non-blocking threads. The response of an invocation is generated in a separate thread. In the special case of a one-way invocation, no response is generated.

Tracking response times of the various processes in an SOA is important to monitor and enable more efficient operation in the SOA. A flow-based approach to response time tracking tracks end-to-end response time by following the execution flow of distributed applications. Important transactions that compose the entire distributed flow are identified, tracked and correlated for each execution instance. Correlation tokens are simply passed from each upstream transaction (parent transaction) to its downstream transactions (children transactions) with the execution flow. This approach is sufficiently generic for all sorts of applications being instrumented without requiring special knowledge of individual applications or code changes. Therefore, it allows for tracking and correlating transactions that flow through a wide range of applications, and is critical for end-to-end response time tracking at instance level.

The flow-based transaction technique can effectively link BPEL artifacts (either synchronous or asynchronous) with IT end-to-end transaction tracking. In synchronous invocations, the flow-based approach provides accurate durations for transactions. However, in some asynchronous invocations, which return immediately after requests are placed in job queues, the response time measured using the flow-based approach will always be "0" even though the actual duration of the asynchronous invocation may be long.

Flow-based approaches can be improved with more correlation techniques; however, a long-running business process requires a deep knowledge of BPEL scripts and special internal correlation mechanisms only available from within business process engines.

Business processes described by BPEL are interpreted and executed by a BPEL engine. A BPEL engine manages the following:

Flow and control of the overall process
State persistence for long-running flows
Correlation of asynchronous messages
Correlation of process activities
Correlation of response with requests
Compensation
Exceptions The BPEL engine can be configured or instrumented to emit business events based on its knowledge of process/invocation state and correlation. Business events emitted by the process server contain process and invocation events already correlated at instance level. Event data (such as state and timestamp data) is stored in an event database and can be queried with instance IDs of business artifacts (such as processes, invoke activities, etc.).

A problem with a purely event-based approach to response time tracking is that instance data in the business process cannot be linked with transactions outside of the business process instance and with downstream IT resources. In other words, business process response time data cannot be linked into end-to-end transaction tracking.

There is, accordingly, a need for a mechanism for end-to-end transaction tracking of long-running processes such as a Business Process Execution Language (BPEL) process in a data processing system, such as a data processing system implemented in a Service-Oriented Architecture (SOA).

SUMMARY OF THE INVENTION

Exemplary embodiments provide a computer implemented method, system and computer usable program code for end-to-end transaction tracking of long-running processes such as a Business Process Execution Language (BPEL) process in a data processing system, such as a data processing system implemented in a Service-Oriented Architecture (SOA). According to exemplary embodiments, this is achieved by utilizing a combined flow-based/event-based approach for transaction tracking. A computer implemented method for tracking and correlating transactions in a process in a data processing system includes gathering instance identification data and instance state data regarding a transaction and storing the instance identification data and instance state data in association with transaction data regarding the transaction. Asynchronous event data is collected, and transaction performance information for an asynchronous event within the transaction is calculated using the transaction data. A tracking report of the transaction is then generated using the calculated transaction performance information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which exemplary embodiments may be implemented;

FIG. 2 is a block diagram of a data processing system in which exemplary embodiments may be implemented;

FIG. 6 illustrates a sample of start event details for a BPEL process according to an exemplary embodiment;

FIG. 7 illustrates sample stop event details for the BPEL process started by the start event details in FIG. 6; and FIG. 8 is a flowchart that illustrates a method for end-to-end transaction tracking of a Business Process Execution Language process in a data processing system in accordance with an exemplary embodiment.

DETAILED DESCRIPTION OF THE PREFERRED EMBODIMENT

Figure 3:
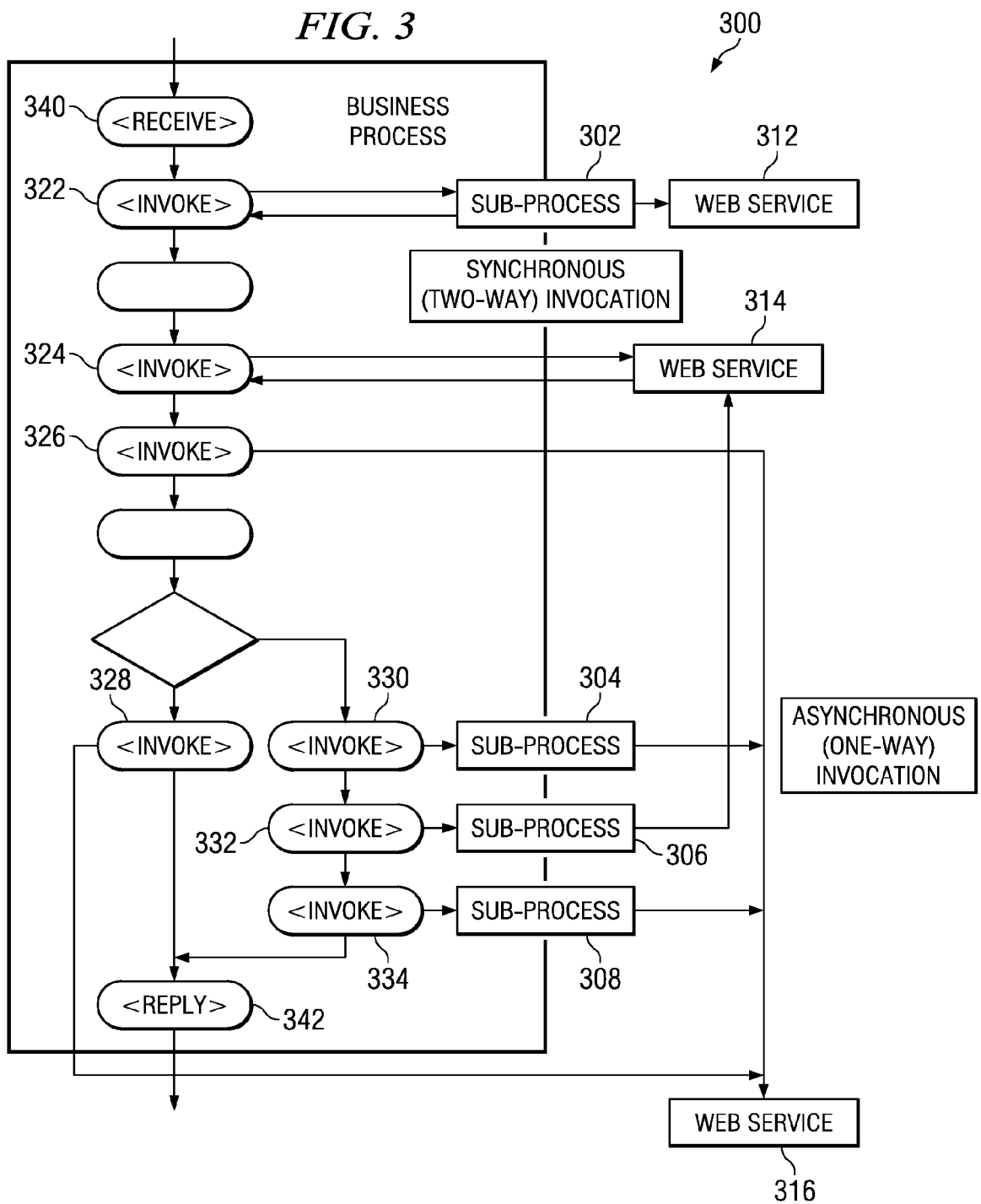
FIG. 3 is a block diagram illustrating an exemplary long-running BPEL process to assist in explaining aspects of exemplary embodiments.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, and universal serial bus (USB) and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP. (Microsoft and Windows are trademarks of Microsoft Corporation in the United States, other countries, or both.) An object oriented programming system, such as the Java™ programming system, may run in conjunction with the operating system and provides calls to the operating system from Java programs or applications executing on data processing system 200. (Java and all Java-based trademarks are trademarks of Sun Microsystems, Inc. in the United States, other countries, or both.)

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments provide a computer implemented method, system and computer usable program code for end-to-end transaction tracking of long-running processes such as a Business Process Execution Language (BPEL) process in a data processing system such as a data processing system implemented in a Service-Oriented Architecture (SOA). According to exemplary embodiments, this is achieved by utilizing a combined flow-based/event-based approach for transaction tracking.

FIG. 3 is a block diagram illustrating an exemplary long-running BPEL process to assist in explaining aspects of exemplary embodiments. In particular, FIG. 3 illustrates BPEL process 300 invoking various sub-processes 302, 304, 306 and 308 and Web services 312, 314 and 316. As shown, the sub-processes include synchronous (two-way) invocations 322 and 324, and asynchronous (one-way) invocations 326, 328, 330, 332 and 334. A request for a service is received at 340, and, following processing, a reply is provided as shown at 342.

In general, both a flow-based approach and an event-based approach to response time tracking in a long running BPEL process such as BPEL process 300 illustrated in FIG. 3, have strengths and weaknesses. Inasmuch as the flow-based approach is critical for correlating a wide range of applications, effective end-to-end transaction tracking must include a flow-based approach. As mentioned previously, a BPEL engine has complete knowledge of the BPEL script and already handles complex, application specific correlations of asynchronous messages. Therefore, having flow-based probes running the same processing on top of the BPEL engine will generate a large amount of runtime overhead. In addition, some long-running business processes can last for days or longer. The flow-based approach simply cannot handle this scenario because the flow-tracking tool cannot tell the difference between a long-running transaction and a hung transaction. As a result, the flow-based tool will give up tracking long running transactions and delete the transaction record from its database. A mechanism that combines the flow-based and event-based approaches (as opposed to running one on top of the other) provides an effective solution to this problem.

Flow-based instrumentation probes currently gather response time for BPEL processes and activities in terms of "transaction instances". Meanwhile, the BPEL engine emits events in terms of "process/activity instances". Each tracking approach utilizes its own correlation mechanism. In accordance with an exemplary embodiment, BPEL instance ID is used to map transaction data with event data. The duration of an asynchronous flow-based transaction is calculated based on event data.

Figure 4:
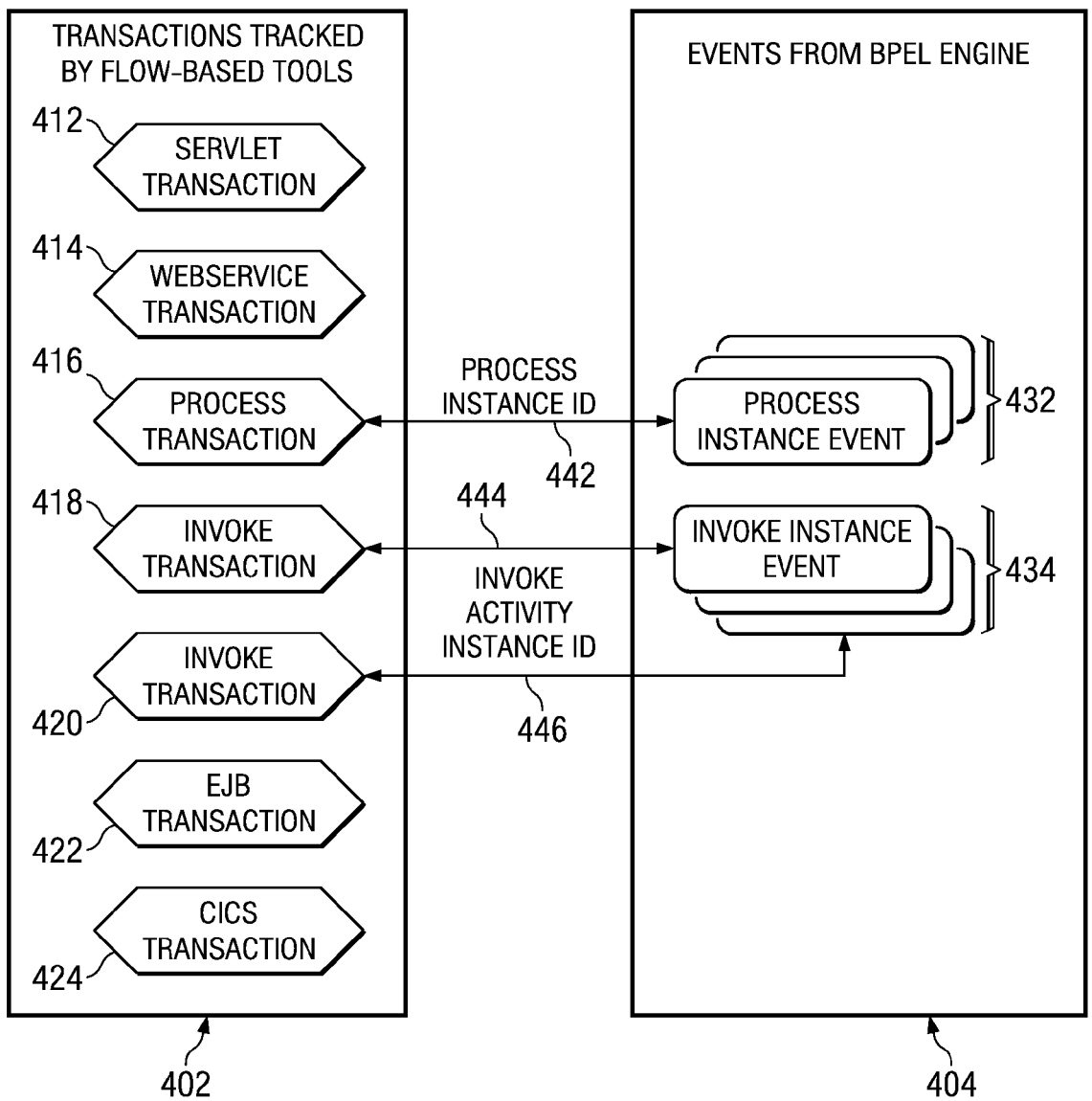
FIG. 4 is a diagram that schematically illustrates cross-correlating flow-based and event-based tracking data in accordance with an exemplary embodiment.

FIG. 4 is a diagram that schematically illustrates cross-correlating flow-based and event-based tracking data in accordance with an exemplary embodiment. Exemplary transactions tracked by flow-based tools are illustrated at 402, and events from a BPEL engine are illustrated at 404. As shown, transactions tracked by flow-based tools include servlet transaction 412, Webservice transaction 414, process transaction 416, invoke transactions 418 and 420, EJB (Enterprise Java Bean) transaction 422 and CICS (Customer Information control System) transaction 424. Events from the BPEL engine include process instance events 432 and invoke instance events 434. As shown by arrows 442, 444 and 446 in FIG. 4, BPEL instance IDs are used to map transaction data with event data.

Current flow-based tracking probes correlate BPEL artifacts with IT end-to-end transactions. In accordance with an exemplary embodiment, in order to support long-running processes, these probes are modified to gather an instance ID and instance states. New probes may also be created if needed. The ID and states will be stored as context data of transactions with a newly defined key: BPELInstanceID.

In general, the process for end-to-end transaction tracking data manipulation according to an exemplary embodiment is as follows:

1. The flow-based tracking probes correlate BPEL artifacts with IT end-to-end transactions and collect other transaction context data including an instance ID and instance states;
2. Transactions are uploaded to a management server database. The durations of asynchronous BPEL artifacts in the database are incorrect in this step. When the system monitoring console is asked to generate reports, step 3 below begins.
3. A new component is added in the management server runtime: the event observer. For asynchronous BPEL transactions only, the event observer queries an event database with the instance IDs stored in the transaction context. The event observer then calculates durations based on event data. The event observer updates the management server's transaction database with correct instance durations and states.
4. The event observer updates the management server's transaction database with the correct instance durations and states.

Figure 5:
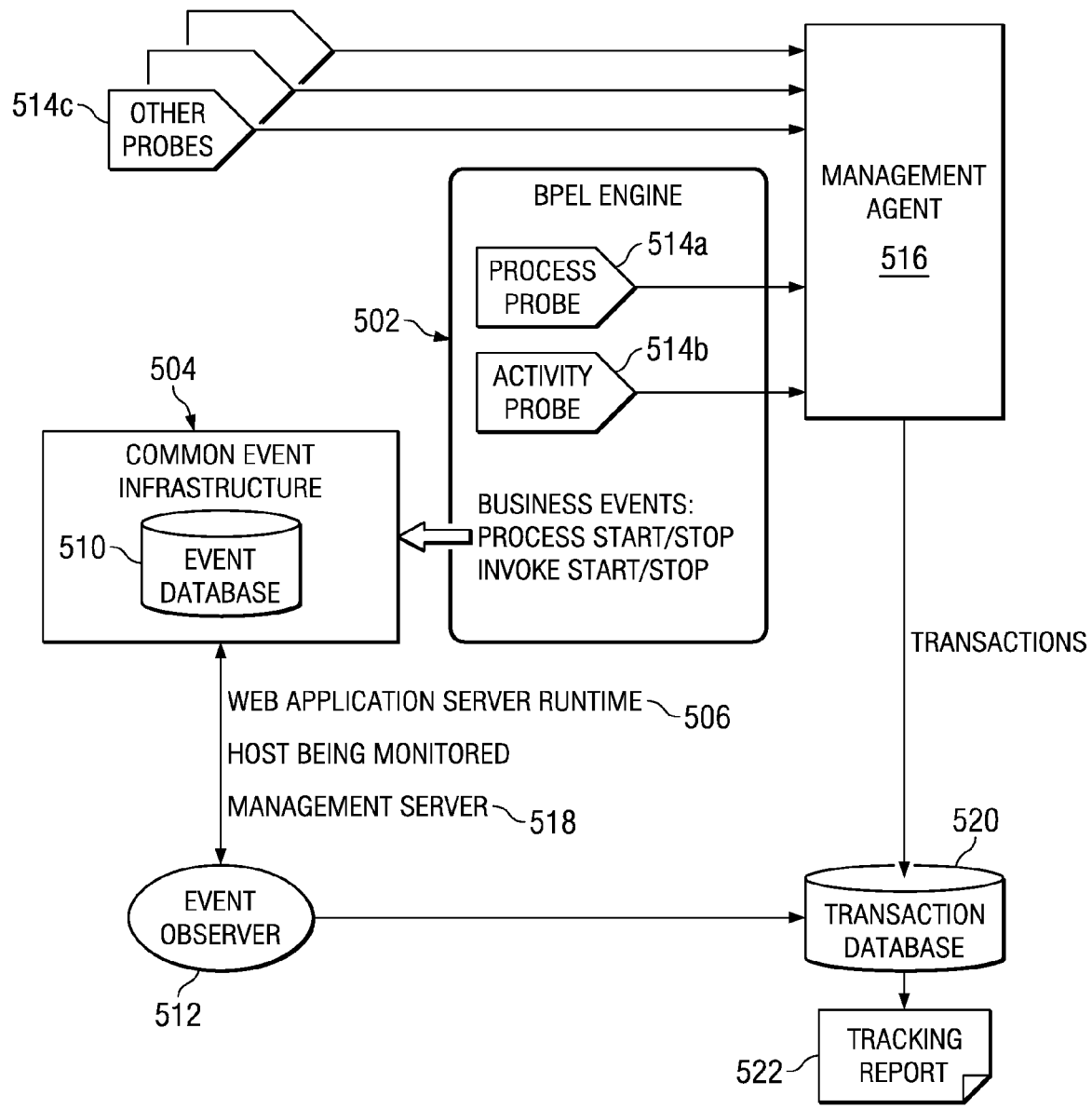
FIG. 5 is a diagram that schematically illustrates end-to-end transaction tracking of a BPEL process using a combined flow-based/event-based approach according to an exemplary embodiment.

FIG. 5 is a diagram that schematically illustrates end-to-end transaction tracking of a BPEL process using a combined flow-based/event-based approach according to an exemplary embodiment. BPEL engine 502 and common event infrastructure 504 are components of Web Application Server Runtime 506. BPEL engine 502 emits events when BPEL processes and other events start and stop. Event database 510 in common event infrastructure 504 can be queried by event observer 512. Flow-based instrumentation probes, including process probe 514a, activity probe 514b and other probes, generally designated by reference number 514c, are injected into Web Application Server Runtime 506 by flow-based tracking tools. Flow-based management agent 516 gathers end-to-end transaction data from the probes and uploads the transactions to management server 518. When it is time to generate tracking reports for users, management server 518 activates event observer 512. Event observer 512 queries event database 510 and calculates durations for asynchronous BPEL artifacts. The management server's transaction database 520 is then updated with correct durations and states for asynchronous BPEL artifacts, and tracking report 522 is generated from the updated information.

Each instance of BPEL artifacts (e.g., process, invoke activity) is associated with a global instance ID which is specific to BPEL applications. This information is not currently collected by flow-based probes. Information regarding these probes can be found in co-pending commonly assigned U.S. patent application Ser. No. 11/193,840 filed Jul. 25, 2005, the disclosure of which is incorporated herein by reference.

In order to be able to associate flow-based transaction data with instance events, flow-based probes must be modified to record instance IDs. In some cases, e.g., process probe 514*a*, the instance ID is not available in the current instrumentation location. Accordingly, new probes must be created based on new instrumentation locations. The instance ID can be stored in the context data area of each transaction as a key-value pair in XML format. The new key for instance ID is "BPELInstanceID".

FIG. 6 illustrates a sample start event details 600 for a BPEL process according to an exemplary embodiment, and FIG. 7 illustrates sample stop event details 700 for the BPEL process started by the start event details in FIG. 6.

As shown in FIGS. 6 and 7, each event is associated with a global instance ID of its BPEL artifact. In the illustrated example, it is "CEC05DB5C52F6E90339824ECD0334F11D9". The type of the artifact is identified by the "extensionName". The type of event is identified by the "situation/categoryName". The state of a BPEL artifact instance is stored in the "ExtendedDataElement:XXX"field of the stop event. Finally, the "creationTime" for each event is the most important information based on which asynchronous instance durations are calculated. Specifically, the following can be done in an event observer:

1. Extract the instance ID in the flow-based transaction database for each asynchronous transaction.
2. Query the event database for all events associated with that instance ID.
3. If a stop event does not exist for the ID, then the state of the instance is "RUNNING". Otherwise, check the "ExtendedDataElement:XXX" to get the state of the instance. Possible states for process and activity are:
    ACTIVITY_RUNNING
    ACTIVITY_COMPLETED
    ACTIVITY_EXPIRED
    ACTIVITY_FAILED
    ACTIVITY_FAILING
    ACTIVITY_STOPPED
    ACTIVITY_TERMINATED
    ACTIVITY_CLAIMED
    ACTIVITY_CLAIM_CANCELED
    PROCESS_RUNNING
    PROCESS_COMPLETED
    PROCESS_TERMINATED
    PROCESS_DELETED
    PROCESS_COMPENSATED
4. For instances that are in "RUNNING" states, the "working duration" is calculated as the following:

duration=Current_Time−Creation_Time Of_Start_Event

5. For instances that are in other states, the "duration" is calculated as the following:

duration=Creation_Time_Of_Stop_Event−Creation_Time_Of_Start_Event

FIG. 8 is a flowchart that illustrates a method for end-to-end transaction tracking of a Business Process Execution Language process in a data processing system in accordance with an exemplary embodiment. The method is generally designated by reference number 800, and begins by deploying the management agent to the application server (Step 802). Probes are then activated in the management agent (Step 804). A determination is made if a BPEL artifact is identified (Step 806). If a BPEL artifact is identified (Yes output of Step 806), a probe retrieves the global instance ID from the BPEL engine (Step 808), and retrieves the transaction duration and context data from the BPEL engine (Step 810). If a BPEL artifact is not identified (No output of Step 806), the probe retrieves the transaction duration and context data from the BPEL engine (Step 810).

The management agent then uploads the retrieved data to the management server database (Step 812), and a determination is made if the duration is equal to zero (Step 814). If the transaction duration is equal to zero (Yes output of Step 814), the duration is calculated based on BPEL events data (Step 816), the correct duration data is uploaded to the management server database (Step 818), and a report is generated and displayed (Step 820). If the transaction duration does not equal zero (No output of Step 814), the report is generated and displayed (Step 820).

Exemplary embodiments thus provide a computer implemented method, system and computer usable program code for end-to-end transaction tracking of long-running processes such as a Business Process Execution Language (BPEL) process in a data processing system, such as a data processing system implemented in a Service-Oriented Architecture (SOA). According to exemplary embodiments, this is achieved by utilizing a combined flow-based/event-based approach for transaction tracking. A computer implemented method for tracking and correlating transactions in a process in a data processing system includes gathering instance identification data and instance state data regarding a transaction and storing the instance identification data and instance state data in association with transaction data regarding the transaction. Asynchronous event data is collected, and transaction performance for an asynchronous event within the transaction is calculated using the transaction data. A tracking report of the transaction is then generated using the calculated transaction performance information.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for tracking and correlating transactions in a process in a data processing system, the computer implemented method comprising:
    gathering instance identification data and instance state data regarding a transaction, wherein gathering instance identification data and instance state data regarding a transaction comprises instrumenting the process with probes for gathering the instance identification data and the instance state data regarding a transaction;
    storing the instance identification data and instance state data in association with transaction data regarding the transaction;
    collecting asynchronous event data;
    calculating transaction performance information for an asynchronous event within the transaction, wherein calculating transaction performance information for an asynchronous event within the transaction comprises calculating a duration of the asynchronous event using the transaction data; and
    generating a tracking report for the transaction using the calculated transaction performance information.

2. The computer implemented method according to claim 1, and further comprising:
    determining whether the calculated duration of the asynchronous event using the transaction data is zero; and
    if the calculated duration of the asynchronous event using the transaction data is zero, calculating the duration of the asynchronous event using the collected asynchronous event data.

3. The computer implemented method according to claim 1, wherein generating a tracking report for the transaction using the calculated transaction performance information comprises:
    generating a tracking report from the calculated transaction performance information to provide end-to-end transaction tracking of the process.

4. The computer implemented method according to claim 1, wherein the process is a Business Process Execution Language process, and wherein the instance identification data comprises Business Process Execution Language instance identification data for mapping the transaction data with the event data.

5. The computer implemented method according to claim 4, and further comprising:
    determining if a Business Process Execution Language process artifact is identified, wherein the instance identification data is gathered if the Business Process Execution Language process artifact is identified.

6. The computer implemented method according to claim 4, wherein calculating transaction performance information for an asynchronous event within the transaction comprises:
    calculating a duration of the asynchronous event using the transaction data, and further comprising:
    determining whether the calculated duration of the asynchronous event using the transaction data is zero; and
    if the calculated duration of the asynchronous event using the transaction data is zero, calculating the duration of the asynchronous event using Business Process Execution Language event data.

7. The computer implemented method according to claim 1, wherein the data processing system is implemented in a Service-Oriented Architecture.

8. A computer program product, comprising:
    a non-transitory computer usable medium having computer usable program code configured for tracking and correlating transactions in a process in a data processing system, the computer program product comprising:
    computer usable program code configured for gathering instance identification data and instance state data regarding a transaction, wherein the computer usable program code configured for gathering instance identification data and instance state data regarding a transaction comprises computer usable program code configured for instrumenting the process with probes for gathering the instance identification data and the instance state data regarding a transaction;
    computer usable program code configured for storing the instance identification data and instance state data in association with transaction data regarding the transaction;
    computer usable program code configured for collecting asynchronous event data; computer usable program code configured for calculating transaction performance information for an asynchronous event within the transaction, wherein the computer usable program code configured for calculating transaction performance information for an asynchronous event within the transaction comprises computer usable program code configured for calculating a duration of the asynchronous event using the transaction data; and
    computer usable program code configured for generating a tracking report for the transaction using the calculated transaction performance information.

9. The computer program product according to claim 8, and further comprising:
    computer usable program code configured for determining whether the calculated duration of the asynchronous event using the transaction data is zero; and
    if the calculated duration of the asynchronous event using the transaction data is zero, computer usable program code configured for calculating the duration of the asynchronous event using the collected asynchronous event data.

10. The computer program product according to claim 8, wherein the computer usable program code configured for generating a tracking report for the transaction using the calculated transaction performance information comprises:

computer usable program code configured for generating a tracking report from the calculated transaction performance information to provide end-to-end transaction tracking of the process.

11. The computer program product according to claim 8, wherein the process is a Business Process Execution Language process, and wherein the instance identification data comprises Business Process Execution Language instance identification data for mapping the transaction data with the event data.

12. The computer program product according to claim 11, and further comprising:

computer usable program code configured for determining if a Business Process Execution Language process artifact is identified, wherein the instance identification data is gathered if the Business Process Execution Language process artifact is identified.

13. The computer program product according to claim 11, wherein the computer usable program code configured for calculating transaction performance information for an asynchronous event within the transaction comprises:

computer usable program code configured for calculating a duration of the asynchronous event using the transaction data, and further comprising:

computer usable program code configured for determining whether the calculated duration of the asynchronous event using the transaction data is zero; and if the calculated duration of the asynchronous event using the transaction data is zero, computer usable program code configured for calculating the duration of the asynchronous event using Business Process Execution Language event data.

14. A system for tracking and correlating transactions in a process in a data processing system, comprising:

probes for gathering instance identification data and instance state data regarding a transaction, wherein the probes instrument the process;

a data storage for storing the instance identification data and instance state data in association with transaction data regarding the transaction;

a mechanism for collecting asynchronous event data;

a calculator for calculating transaction performance information for an asynchronous event within the transaction, wherein the calculator calculates a duration of the asynchronous event using the transaction data; and a mechanism for generating a tracking report for the transaction using the calculated transaction performance information.

15. The system according to claim 14, and further comprising:

a mechanism for determining whether the calculated duration of the asynchronous event using the transaction data is zero; and if the calculated duration of the asynchronous event using the transaction data is zero, the calculator calculating the duration of the asynchronous event using the collected asynchronous event data.

16. The system according to claim 14, wherein the process is a Business Process Execution Language process, and wherein the data processing system is implemented in a Service-Oriented Architecture.

* * * * *